(12) United States Patent
Ashkenazi et al.

(10) Patent No.: US 7,620,415 B2
(45) Date of Patent: Nov. 17, 2009

(54) METHOD AND APPARATUS OF POWER CONTROL

(75) Inventors: Rony Ashkenazi, Kidron (IL); David Ben-Eli, Modiin (IL); Gil Katzir, Herzliya (IL); Moti Altahan, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 11/522,947

(22) Filed: Sep. 19, 2006

(65) Prior Publication Data

US 2008/0070613 A1 Mar. 20, 2008

(51) Int. Cl.
*H04B 7/00* (2006.01)
(52) U.S. Cl. ............ 455/522; 455/67.11; 455/68; 455/69
(58) Field of Classification Search ......... 455/67.11, 455/68, 69, 522, 115.3, 126, 127.1, 127.2, 455/135, 226.3, 277.2, 296; 370/318, 320
See application file for complete search history.

(56) References Cited

U.S. PATENT DOCUMENTS

| | | | |
|---|---|---|---|
| 2004/0128454 A1 | 7/2004 | Altahan et al. | |
| 2004/0235510 A1* | 11/2004 | Elicegui et al. | 455/522 |
| 2005/0181822 A1* | 8/2005 | Sasaki et al. | 455/552.1 |
| 2005/0276314 A1* | 12/2005 | Dateki et al. | 375/148 |
| 2006/0212784 A1 | 9/2006 | Griniasty et al. | |
| 2007/0049280 A1* | 3/2007 | Sambhwani et al. | 455/442 |
| 2007/0237266 A1* | 10/2007 | Reial et al. | 375/341 |
| 2007/0248190 A1* | 10/2007 | Nilsson | 375/340 |

* cited by examiner

*Primary Examiner*—Duc Nguyen
*Assistant Examiner*—Dominic E Rego
(74) *Attorney, Agent, or Firm*—Shiloh Buchek PLLC

(57) ABSTRACT

Briefly, a wireless communication device, a wireless communication system and a method of controlling a transmission power level of a dedicated channel signal transmitted in a compress mode with an alternate scrambling code. The method includes transmitting one or more power control commands to a base station to control a transmission power of one or more frames scrambled by primary scrambling codes and prior of receiving a dedicated channel signal scrambled by alternate scrambling codes, transmitting one or more pre-alternate scrambling codes power control commands.

18 Claims, 3 Drawing Sheets

METHOD AND APPARATUS OF POWER CONTROL

BACKGROUND OF THE INVENTION

In cellular systems such as, for example a Wideband Division Multiple Access (WCDMA) or Global System for Mobile communication (GSM) cellular system power control is used to set the received signal at an appropriate level for reception, while minimizing interference to other users. A mobile station (MS) may send a power control commands to a base station (BS) to control the power of the signal it receives.

In WCDMA cellular system a MS is capable of operating in a compress mode (CM). Whilst operating in the CM mode, the communication between the BS and the MS is compressed in time, leaving time gaps which are used by the MS to search for base stations that operate in frequencies other than the current operating frequency of the MS.

Operation in CM mode may be applicable by the BS over a downlink (DL) and/or by the MS over an uplink (UL), separately. In operation in CM mode over the DL, the BS compresses the information it sends over the DL, from a whole data frame to a portion of the data frame in order to create gaps in the DL transmission. For example, the BS may shorten the duration of each symbol without changing the number of symbols in a frame, which is known in the art as spreading factor reduction. The gaps in the DL transmission may be used by the MS to perform measurements on different frequencies.

In a WCDMA cellular system, each BS uses a unique primary scrambling code (PSC) to spread its transmission over the whole frequency bandwidth (BW). During compressed frames, the BS may use an alternate scrambling code (ASC) on the portion of the transmission of the MS which is in the CM. On the other portion of the transmission the BS may use the PSC.

According to a present art of WCDMA cellular system, the WCDMA downlink power control loop is based on two loops: an outer loop and an inner loop. The inner loop measures a dedicated channel (DCH) signal to interference ratio (SIR) in each slot and compares the DCH SIR to a target SIR. If the measured DCH SIR is higher than the target SIR than a command to decrease a DCH power is sent to the BS. Otherwise, a command to increase the DCH power is sent to the BS. The outer loop sets the target SIR to achieve a quality of service value (QoS) given by a target block error rate (BLER).

In CM, the MS may search in a predefined time window (e.g., the gap) on the DCH, the existence of either GSM or WCDMA networks on frequencies different than its operation frequency. A WCDMA BS may transmit in the predefined time window, compressed frames scrambled by an ASC while non-compressed frames are scrambled by a PSC. It should be understood that the PSC is not orthogonal to the ASC. This may cause a large SIR difference between uncompressed frames and compressed frames of the DCH. Thus, the difference between the frames may not be compensated by the inner loop within the duration of the compressed frame. The SIR difference may force the outer loop to increases the SIR target in order to maintain the required QoS and to cause a large increase in the average DCH signal power. This will increase the interference to other users and reduce the capacity of the WCDMA network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
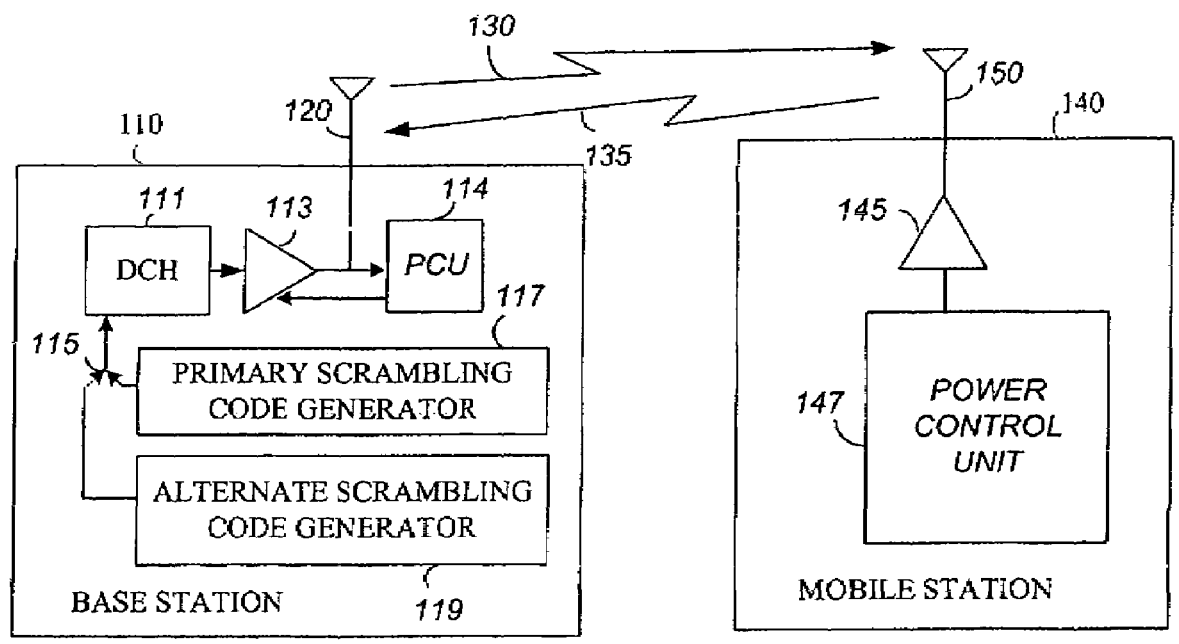
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the signal processing arts to convey the substance of their work to others skilled in the art.

It should be understood that the present invention may be used in a variety of applications. Although the present invention is not limited in this respect, the circuits and techniques disclosed herein may be used in many apparatuses such as mobile stations and base stations of a cellular radio system.

Types of cellular radiotelephone base stations and/or mobile stations intended to be within the scope of the present invention may include, but are not limited to, Code Division Multiple Access (CDMA), CDMA-2000, WCDMA and cellular radiotelephone base stations and/or mobile stations that transmit or receive spread spectrum signals, base stations and/or mobile stations for global system for mobile communication (GSM), base stations and/or mobile stations for third generation cellular systems (3G), base stations and/or mobile stations that transmit or receive orthogonal frequency division multiplexing (OFDM), or the like.

Turning first to FIG. 1, a schematic illustration of a wireless communication system 100 according to an exemplary embodiment of the present invention is shown. Although the scope of the present invention is not limited to this example, wireless communication system 100 may be a WCDMA cellular radio telephony system, for example Universal Mobile Telecommunications System (UMTS), if desired. Wireless communication system 100 may include, at least one base station (BS) 110 and an at least one mobile station (MS) 140. MS 140 may include a transmitter 145, a power control unit 147 and an antenna 150. BS 110 may include a dedicated channel signal (DCH) generator 111, a transmitter 113, a power control unit (PCU) 114, a switch 115, a PSC generator 117 and an ASC generator 119.

According to some exemplary embodiments of the present invention, BS 110 may transmit over a DL 130 a DCH signal generated by DCH signal generator 111, and scrambled by a PSC generated by PSC generator 1117. Power control unit 147 of MS 140 may perform a power measurement of a received DCH signal and may generate a power control command based on this measurement. Transmitter 145 may transmit the power control command over an UL 135. PCU 114 of BS 110 may receive the power control command and may adjust the gain of transmitter 113, accordingly.

Although the scope of the present invention is not limited in this respect, BS 110 may transmit DCH in a compress mode (CM) with an alternate scrambling code. Switch 115 may switch from PSC generator 117 to ASC generator 119 which may scramble the DCH with the alternate scrambling code.

According to this exemplary embodiment of the invention, BS 110 may transmit DCH signal scrambled by the ASC, in CM, with a desired power level. MS 140 may send one or more pre ASC power control commands to BS 110 prior to the transmission of a compressed frame (CF).

According to embodiments of the invention, the one or more pre ASC power control commands may control the BS transmitted power prior to the transmission of the CF. MS 140 may control BS 110 transmitted power to reach its desired Signal to Interference Ratio (SIR) prior to the transmission of the CF with ASC. MS 140 may send one or more pre ASC power control commands in order to reach the desires SIR within the compressed frame, if desired. For example, MS 140 may send power up and/or power down control commands at a rate of 1500 Hz.

Although the scope of the present invention is not limited in this respect, antennas 120 and/or 150 of BS 110 and MS 140 respectively, may be used to receive and/or transmit signals over DL 130 and UL 135, if desired. Antennas 120 and/or 150 may include an internal antenna, a dipole antenna, an omni-directional antenna, a monopole antenna, and an end fed antenna, a circularly polarized antenna, a micro-strip antenna, a diversity antenna, and the like.

Figure 2:
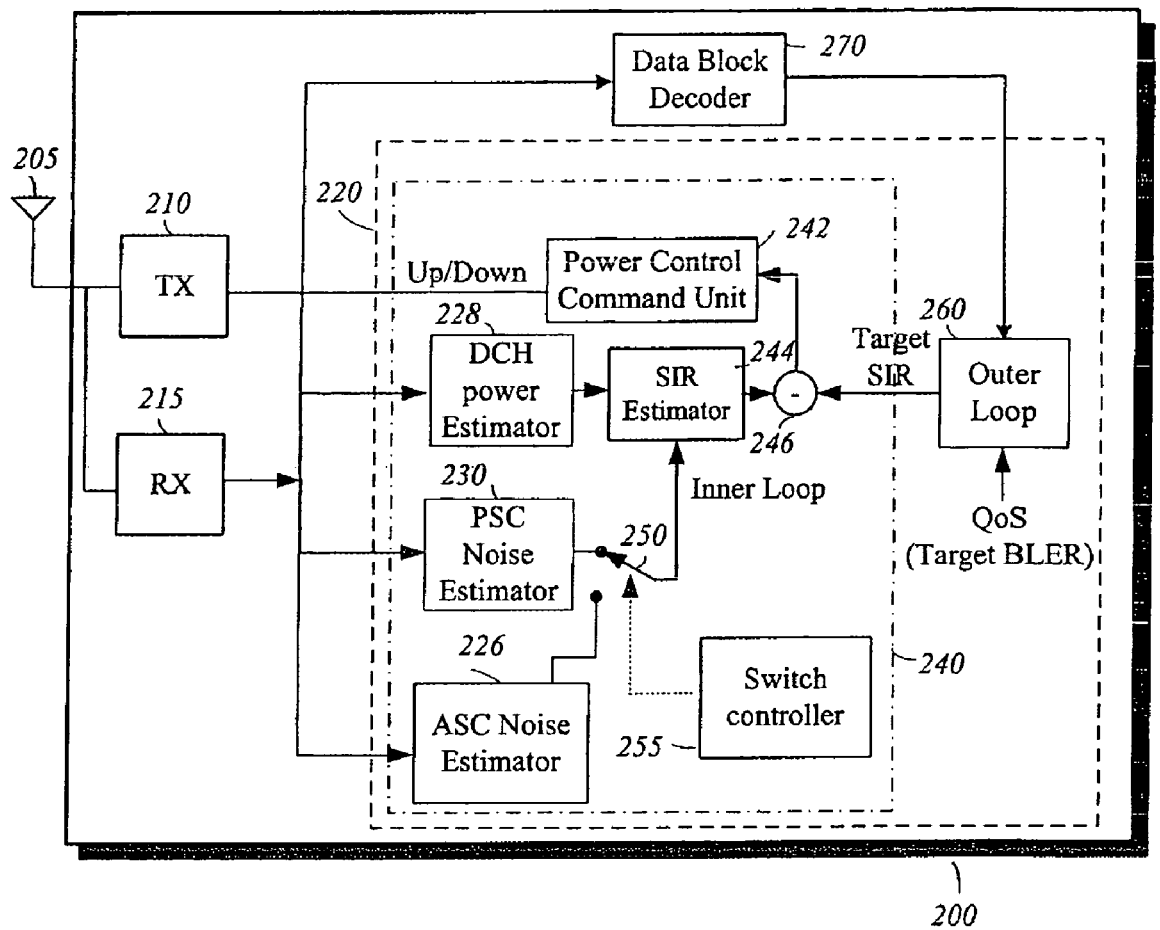
FIG. 2 is a schematic illustration of a block diagram of a wireless communication according to some embodiments of the present invention.

Turning to FIG. 2, a block diagram of a wireless communication device 200 (e.g., MS 140) according to some exemplary embodiment of the present invention is shown. Although the scope of the present invention is not limited in this respect, wireless communication device 200 may include at least one antenna 205, a radio transmitter (TX) 210, a radio receiver (RX) 215, a power control unit 220 and a data block decoder 270.

According to this exemplary embodiment, power control unit 220 may include an inner loop 240 and an outer loop 260. Inner loop 240 may include an ASC noise estimator 226, a DCH power estimator 228, a PSC noise estimator 230, a switch 250, a switch controller 255, a power control command unit 242, a SIR estimator 244 and a comparator 246.

According to this exemplary embodiment antenna 205 may receive a signal via a downlink (e.g, DL 130). RX 215 may receive the signal and may provide the received signal to power control unit 220. For example, RX 215 may provide the received signal to DCH power estimator 228, PSC noise estimator 230 and data block decoder 270, respectively. DCH power estimator 228 and/or PSC noise estimator 230 may provide an estimated power level and an estimated noise level to SIR estimator 244. SIR estimator 244 may output an estimated SIR, if desired. Comparator 246 may compare the estimated SIR with a SIR target provided by outer loop 260. The SIR target may be determined by a quality of service (QoS) parameter (e.g., a target BLER), an error rate of DCH (provided by data block decoder 270) or the like.

According to this exemplary embodiment of the invention, power control command unit 242 may generate a power up and/or power down command. IX 210 may transmit the power control command to a BS over the UL, if desired. Furthermore, according to some embodiments of the invention, in the CM, inner loop 260 may send pre ASC power control commands until the target SIR is met.

For example, in the CM, switch 250 may be switched to provide noise estimation for DCH signal with a PSC or may be switched to provide noise estimation for DCH signal with an ASC, if desired. ASC noise estimator 226 may measure a received signal strength indicator (RSSI) of the received signal. The RSSI measurement may serve as an estimation of a noise when a base station (e.g., BS 110) may transmit the DCH signal scrambled by the ASC.

Furthermore, ASC noise estimator 226 may provide the ASC noise estimation to SIR estimator 244. Switch controller 255 may control switch 250 to be switched at a predetermined time e.g., Δ, prior to receiving a compressed frame of DCH signal, in order to provide the ASC noise estimation to inner loop 240. Thus, power control commands unit 242 may provide pre ASC power control commands to set a DCH transmission power of the base station to a desired level prior a transmission of DCH signal scrambled with an ASC, if desired.

In some embodiments of the present invention, the switch time of switch 250 from PSC noise estimator 230 to ASC noise estimator 226 may be calculated according to the difference between the PSC noise estimation and the ASC noise estimation levels. Inner loop 260 may operate according to the difference between the PSC noise estimation and the ASC noise estimation levels to generate pre ASC power control commands to BS in the UL prior to the transmission of the DCH signal with ASC in the CM.

For example, the number of the pre ASC power control commands, which also may be referred as power control steps, may be calculate according to the following equation:

Number of Pre ASC Power Control Commands=(ASC Noise Level−PSC Noise Level)/(Power Control Command Level [dB]).

It should be understood that the PSC Noise Level and/or ASC Noise Level may be an estimated noise level and/or a measurement of the noise level, although the scope of the present invention is not limited by this example.

Furthermore, in some embodiments of the present invention, the switch time of switch 250 from PSC noise estimator 230 to ASC noise estimator 226 may be set at a predetermined time prior to the DL compressed frame reception, such as, for example, one frame prior to the DL compressed frame reception. Inner loop 260 generate pre ASC power control commands to the base station in the UL prior to the transmission of the DCH signal with ASC in the CM based on the setting of the pre determined time period, if desired.

Figure 3:
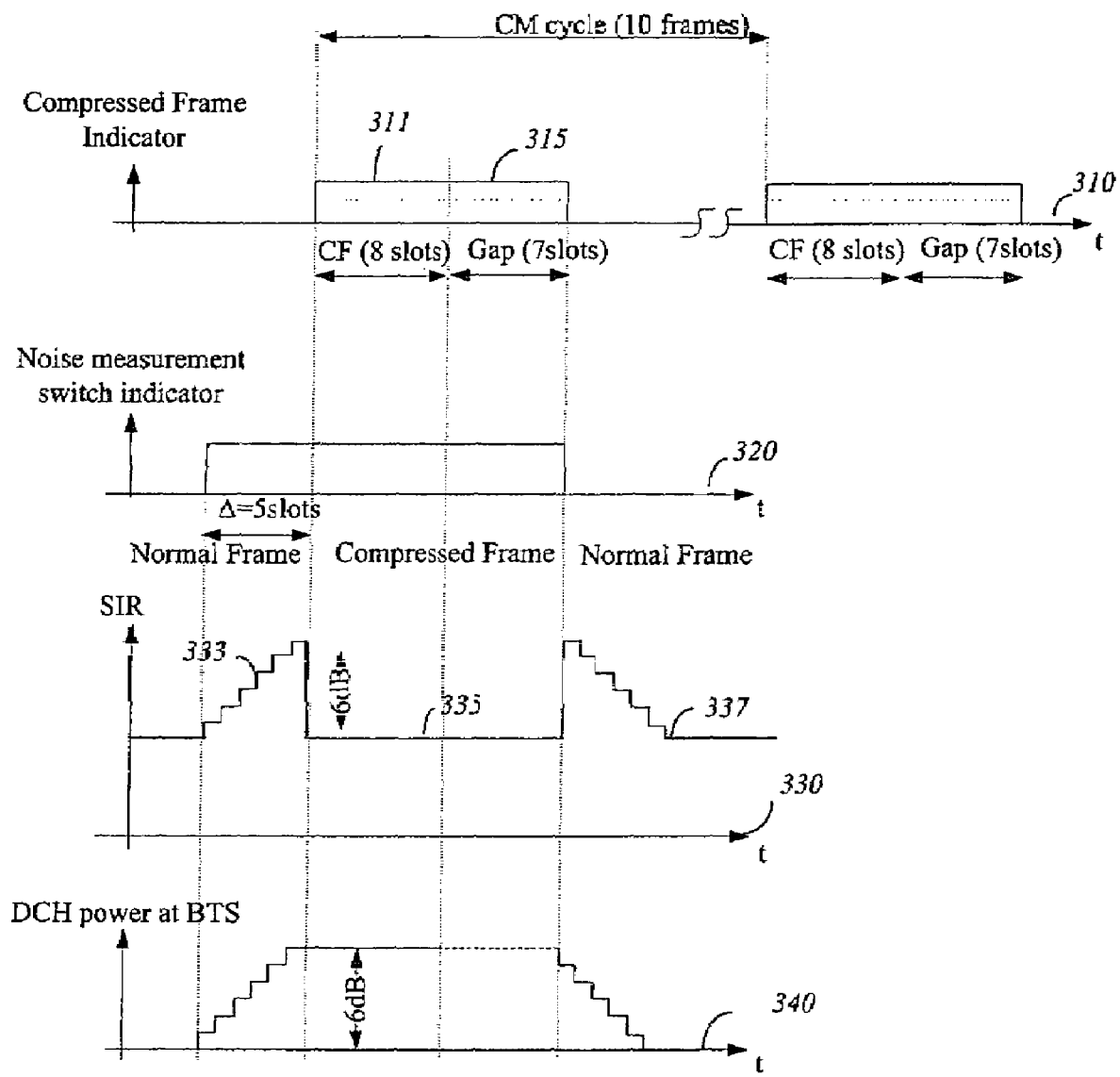
FIG. 3 is an illustration of a plurality of time diagrams helpful to describe a method of controlling a power level of dedicated channel according to some embodiments of the present invention.

Turning to FIG. 3, an illustration of a plurality of time diagrams helpful to describe a method of controlling a power level of DCH signal according to some embodiments of the present invention is shown. Although the scope of the present invention is not limited to this example, in a WCDMA cellular system, a single compressed frame may be transmitted periodically every ten frames. For example, the compressed frame may include eight compressed slots 311 and a gap 315 of seven slots (as is shown in timing diagrams 310 and 320). In this example, a WCDMA frame may include 15 slots.

According to some exemplary embodiments of the present invention, as is shown by timing diagram 330, the difference in noise and interference levels between the uncompressed frame using the PSC and the compressed frame using the ASC may be for example, 6 dB. For example, a power control command may command to increase and/or decrease the power level by 1 dB, thus, a minimal Δ may be set to 6 slots, if desired. According to embodiments of the invention, the MS may send six up pre ASC power control commands 333 to the BS in order to increase the BS TX power by 6 dB over the six slots of the frame prior to the compressed frame scrambled by an ASC. Thus, the MS may meet the target SIR during the CF, as is shown in time period 335.

After completing the transmission of DCH signal in a compressed frame scrambled by the ASC, the BS may return to transmit signals scrambled by the PSC. The TX power control level may converge to a required level, if desired (as is shown in time period 337). In other embodiments of the invention, the MS may send further six down power control commands to the base station in order to return the TX power level to its original level (timing diagram 340).

For example, the MS may control the BS transmitted power to reach its desired SIR assuming ASC is used, prior to the transmission of the CF with ASC. The MS may send six pre ASC power control commands 333 to the BS prior to the transmission of the CF. Thus, the MS may receive the CF with the desires SIR.

According to some exemplary embodiments of the invention, the noise estimation during ASC may be estimated directly by measuring the noise over the ASC, or by using an RSSI measurement of a received signal as an approximation, of the noise level with alternate scrambling code. The RSSI measurement may serve as an estimation of a noise when a base station (e.g., BS 110) may transmit the DCH signal scrambled by the ASC. In some embodiments of the invention, the RSSI measurement of the received signal may be multiplied by a factor, for example 0.9, and the multiplied RSSI may be set as the noise level estimation, although it should be understood that the scope of the present invention is not limited to this example.

While certain features of the invention have been illustrated and described herein, many modifications, substitutions, changes, and equivalents will now occur to those skilled in the art. It is, therefore, to be understood that the appended claims are intended to cover all such modifications, substitutions, changes, and equivalents as may fall within the true spirit of the invention.

What is claimed is:

1. A method comprising:
   transmitting, by a transmitter, one or more power control commands to a base station to control a transmission power of one or more frames scrambled by at least one primary scrambling code;
   prior to receiving a dedicated channel signal scrambled by at least one alternate scrambling code, transmitting by the transmitter one or more pre-alternate scrambling codes power control commands;
   estimating a first noise level of a received signal scrambled by the primary scrambling code;
   estimating a second noise level of a future expected received signal scrambled by the alternate scrambling code; and
   calculating a number of the pre-alternate scrambling codes power control commands based on the first and second noise level estimations and a power control step.

2. The method of claim 1, further comprising:
   receiving the dedicated channel signal having a compressed frame and scrambled by the alternate scrambling codes in a compressed mode.

3. The method of claim 1 wherein, estimating the second noise level comprises:
   setting a measurement of a received signal strength indicator as the second noise level.

4. The method of claim 1 wherein, estimating the second noise level comprises:
   determining a product of a measurement of a received signal strength indicator and a predetermined factor; and
   setting the determined product as the second noise level.

5. The method of claim 1 comprising:
   operating an inner loop of a power control unit according to the second noise level estimation at least one frame prior to a transmission of a compressed frame scrambled with alternate scrambling codes.

6. The method of claim 5, wherein the operating comprises:
   setting a target signal to interference ratio; and
   sending the pre-alternate scrambling codes power control commands until the target signal to interference ratio is met.

7. A wireless communication device comprising:
   a transmitter to transmit to a base station one or more power control commands to control a transmission power of one or more frames scrambled by at least one primary scrambling code and, prior to receiving a dedicated channel signal scrambled by at least one alternate scrambling code, to transmit one or more pre-alternate scrambling codes power control commands;
   a noise estimator to estimate a first noise level of a received signal scrambled by the primary scrambling code;
   an alternate scrambling codes noise estimator to estimate a second noise level of a future expected received signal scrambled by the alternate scrambling code; and
   a power control command unit to calculate a number of the pre-alternate scrambling codes power control commands based on the first and second noise level estimations and a power control step.

8. The wireless communication device of claim 7, comprising:
   a receiver to receive the dedicated channel signal having a compressed frame and scrambled by the alternate scrambling codes in a compressed mode.

9. The wireless communication device of claim 7 wherein, the alternate scrambling codes noise estimator is able to set a received signal strength indicator measurement as the second noise level.

10. The wireless communication device of claim 7, wherein the alternate scrambling codes noise estimator is able to determine a product of a measurement of a received signal strength indicator and a predetermined factor, and to set the determined product as the second noise level.

11. The wireless communication device of claim 7, comprising:
   a power control unit having an inner loop and an outer loop, wherein the inner loop is set, at least one frame prior to a transmission of a compressed frame scrambled with alternate scrambling codes, to the second noise level estimation, and wherein the inner loop is able to send pre alternate scrambling code power control commands according to the second noise level estimation.

12. The wireless communication device of claim 7, comprising:
a power control unit having an inner loop and an outer loop, wherein the outer loop is set with a target signal to interference ratio, and wherein the inner loop is able to send pre alternate scrambling code power control commands until the target signal to interference ratio is met.

13. A wireless communication system including:
a wireless communication device including:
a transmitter to transmit to a base station one or more power control commands to control a transmission power of one or more frames scrambled by at least one primary scrambling code and, prior to receiving a dedicated channel signal scrambled by at least one alternate scrambling code, to transmit one or more pre-alternate scrambling codes power control commands;
a noise estimator to estimate a first noise level of a received signal scrambled by a the primary scrambling code;
an alternate scrambling codes noise estimator to estimate a second noise level of a future expected received signal scrambled by the alternate scrambling code; and
a power control command unit to calculate a number of the pre-alternate scrambling codes power control commands based on the first and second noise level estimations and a power control step.

14. The wireless communication system of claim 13, wherein the wireless communication device comprises:
a receiver to receive the dedicated channel signal having a compressed frame and scrambled by the alternate scrambling codes in a compressed mode.

15. The wireless communication system of claim 13, wherein, the alternate scrambling codes noise estimator is able to set a received signal strength indicator measurement as the second noise level.

16. The wireless communication system of claim 13, wherein the alternate scrambling codes noise estimator is able to determine a product of a measurement of a received signal strength indicator and a predetermined factor, and to set the determined product as the second noise level.

17. The wireless communication system of claim 13, wherein the wireless communication device includes:
a power control unit having an inner loop and an outer loop, wherein the inner loop is set, at least one frame prior to a transmission of a compressed frame scrambled with alternate scrambling codes, to the second noise level noise estimation, and wherein the inner loop is able to send pre alternating scrambling code power control commands according to the second noise level estimation.

18. The wireless communication system of claim 13, wherein the wireless communication device includes:
a power control unit having an inner loop and an outer loop, wherein the outer loop is set with a target signal to interference ratio, and wherein the inner loop is able to send pre alternating scrambling code power control commands until the target signal to interference ratio is met.

* * * * *

UNITED STATES PATENT AND TRADEMARK OFFICE
CERTIFICATE OF CORRECTION

PATENT NO. : 7,620,415 B2
APPLICATION NO. : 11/522947
DATED : November 17, 2009
INVENTOR(S) : Rony Ashkenazi et al.

It is certified that error appears in the above-identified patent and that said Letters Patent is hereby corrected as shown below:

In column 6, line 10, in Claim 2, delete "codes" and insert -- code --, therefor.

In column 6, line 51, in Claim 8, delete "codes" and insert -- code --, therefor.

In column 7, line 21, in Claim 13, after "by" delete "a".

In column 8, line 3, in Claim 14, delete "codes" and insert -- code --, therefor.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,620,415 B2 | Page 1 of 1 |
| APPLICATION NO. | : 11/522947 | |
| DATED | : November 17, 2009 | |
| INVENTOR(S) | : Ashkenazi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this

Twenty-sixth Day of October, 2010

David J. Kappos
*Director of the United States Patent and Trademark Office*